Sept. 10, 1968    D. L. McKAY    3,400,512
METHOD FOR REMOVING WATER AND HYDROCARBONS FROM GASEOUS HCl
Filed July 5, 1966
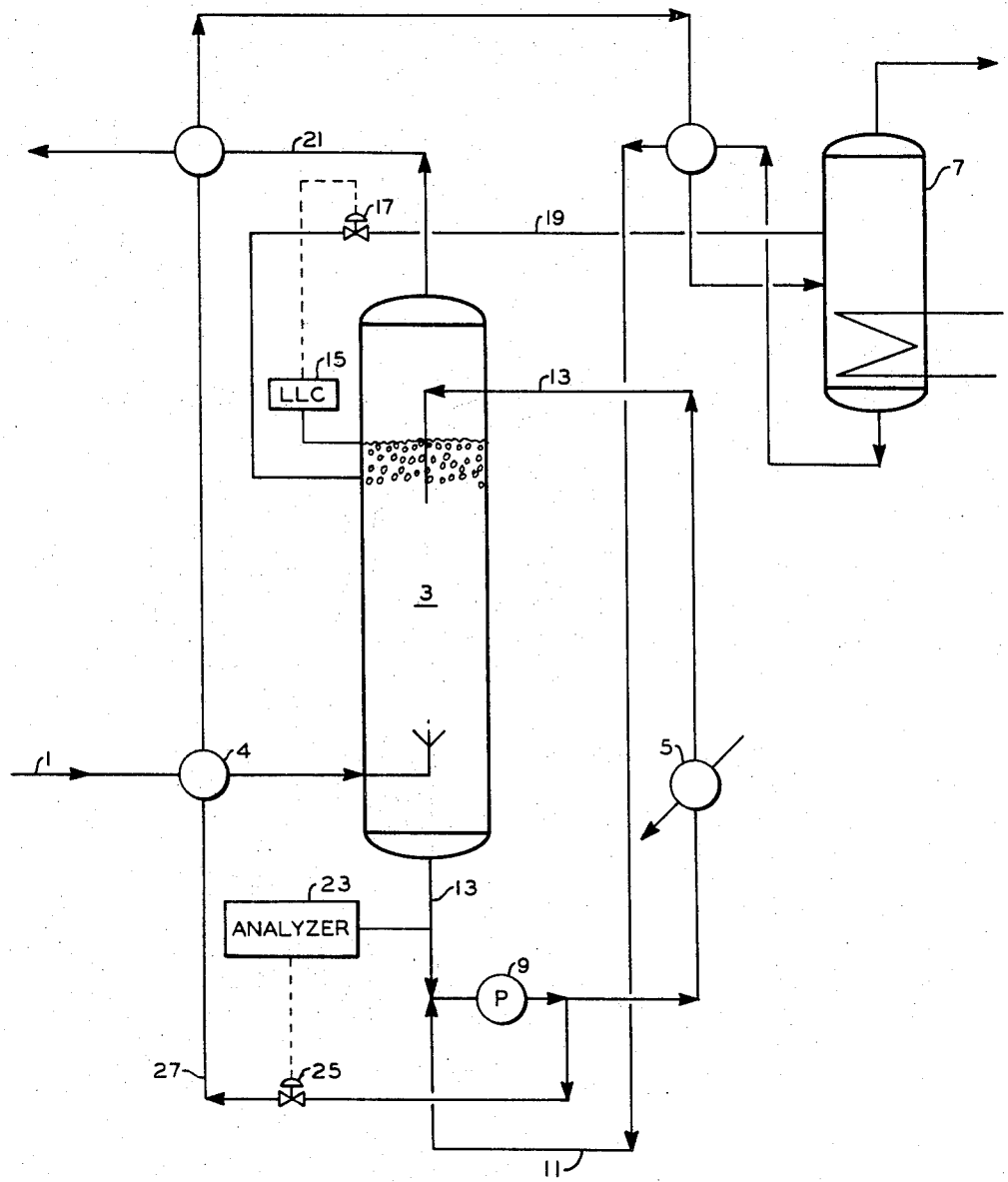
INVENTOR
D.L. McKAY
BY  Young & Quigg
ATTORNEYS 3,400,512
**METHOD FOR REMOVING WATER AND
HYDROCARBONS FROM GASEOUS HCl**
Dwight L. McKay, Bartlesville, Okla., assignor to Phillips
Petroleum Company, a corporation of Delaware
Filed July 5, 1966, Ser. No. 562,840
3 Claims. (Cl. 55—69)

ABSTRACT OF THE DISCLOSURE

A multi-component vapor stream is purified by contacting said stream in a vapor cooling zone with a refrigerant pre-cooled to a temperature below the freezing point of at least one of the components of said stream to separate frozen component and separately removing said frozen component and remaining purified vapor from said zone.

---

The present invention relates to a method for purifying vaporous streams. In one of its aspects, it relates to a separation and purification of components of a vaporous multi-component mixture by fractional crystallization. In another aspect the invention relates to a method for directly freezing water and hydrocarbon impurities which contaminate a gaseous stream of HCl and separating the formed solids from the gaseous HCl.

In the production of alkylate, HCl vapor is formed in rather large quantities as a by-product. This HCl gas is contaminated with benzene, paraffin hydrocarbons and water. In a copending application, bearing Ser. No. 562,848, filing date July 5, 1966, of Walter C. Hart and assigned to a common assignee, Phillips Petroleum Company of Bartlesville, Okla., there is described an indirect method to remove these impurities from the gaseous HCl. In this copending application there is described a method wherein a heat exchange fluid is passed through a chiller in indirect heat exchange relation with the vaporous mixture. Because the hydrocarbon crystals tend to form on the walls of the chiller, it was necessary to provide the chiller with scrapers to remove the crystals from the walls thereof. It would greatly simplify the process and provide a more efficient operation if a method for crystal formation were provided which would make it possible to eliminate the scrapers.

The following are objects of the invention:

It is an object of the invention to provide an improved method for the separation and purification of multi-component gaseous mixtures by fractional crystallization.

Another object of the invention is to provide a method for purifying a gaseous HCl contaminated with water and hydrocarbon impurities.

Yet another object of the invention is to provide a method for passing a heat exchange fluid in direct contact with a gaseous mixture of HCl containing water and hydrocarbon impurities whereby the water and hydrocarbon impurities are removed from the vaporous HCl through fractional crystallization.

Other objects and many of the attendant advantages of this invention will be readily appreciated as the same becomes better understood by reference to the following detailed description which is to be considered in connection with the accompanying drawings wherein:

The sole figure in the case is a flow diagram representing the process of the subject invention.

Broadly speaking, the present invention resides in a fractional crystallization process which comprises the steps of passing a vaporous gaseous mixture in direct contact flow with a liquid at a temperature sufficient to freeze at least one component from said mixture; withdrawing the crystals formed in a first section of said zone and recovering the purified gas from a second section of said zone.

With reference to the figure, a vaporous multi-component feed mixture is pumped from a source not shown via conduit 1 through an economy heat exchanger 4 into a cooling zone 3. In zone 3 the vaporous feed mixture is mixed with a liquid refrigerant which is immiscible with the feed mixture and cooled to a temperature below that at which the components to be separated from the mixture crystallize. The liquid refrigerant is pumped from a fractionator 7 by pump 9 via conduit 11 into a refrigerant recycle line 13 through a refrigerating means 5 into the upper part of zone 3.

As a refrigerant it is preferred to use calcium chloride brine, but sodium chloride or similar brine can be used, and it is within the scope of the invention to employ other refrigerating media such as an alcohol-water mixture, glycols, Freon, etc.

A liquid level controller 15 is operatively connected to valve 17 which controls the rate of flow in line 10 in order to maintain a predetermined level of liquid refrigerant in zone 3. The level of refrigerant in zone 3 is maintained at a height sufficient to maintain the interface between the purified vaporous product and the liquid refrigerant below the point where the refrigerant recycle line 13 reenters zone 3. By introducing the feed into the bottom of zone 3 and passing it up through the liquid refrigerant, a maximum amount of the feed mixture is rapidly brought into contact with the refrigerant. As a result of passing the gaseous mixture up through the refrigerant, frozen droplets of the higher freezing components present in the gaseous feed are formed. These crystal droplets float in the refrigerant and are removed via line 19 and passed to the refrigerant fractionator 7 where the refrigerant is purified by fractionating or the like. The purified gaseous vapor is removed from the top of shell 3 via line 21. Liquid refrigerant is removed from the bottom of zone 3 via recycle line 13.

The brine being removed from the bottom of shell 3 via line 13 is analyzed by a suitable instrument such as a chromatographic analyzer 23 described in Patent No. 3,164,980 to determine the amount of feed components contained therein. This chromatographic analyzer 23 is operatively connected to a valve 25 which controls the flow in a slip line 27. A density, conductivity, or refractive index measuring analyzer may also be used. The removal of refrigerant from line 13 via line 27 controls the amount of impurities being recycled to zone 3 via line 13. The refrigerant passes through economy heat exchanger 4 in order to cool the feed flowing in conduit 1 into freezing zone 3.

The following illustrative example, which is not intended to unduly limit the scope of the invention, will provide a more comprehensive understanding of the invention.

In accordance with this example, utilizing the broad concept of directly freezing out at least one component from a multi-component mixture, a feedstock having the following composition by weight:

| | |
|---|---|
| Gaseous HCl | 99.0 |
| Water | 0.5 |
| Benzene+paraffins | 0.5 | is passed at a rate of 100 pounds per hour via conduit 1 at 70° F. and 90 pounds per square inch absolute pressure into the bottom of zone 3. Simultaneously with the introduction of the feed mixture into zone 3, a 20 weight percent calcium chloride brine solution is cooled to −20° F. by indirect heat exchange in refrigerating means 5 with propane boiling at −30° F. and a pressure of 20 p.s.i.a. The brine circulation rate in recycle line 13 is maintained at about 400 pounds per hour and said brine enters the top of zone 3 via conduit 13 at −20° F. and leaves at −10° F. Fifty pounds per hour of the brine are passed to the brine fractionator 7 via slip line 27 for removal of 0.98 pound per hour of water, benzene, and paraffin. Purified HCl stream leaves the top of column at −20° F. and 90 p.s.i.a with the following composition.

| | Weight percent |
|---|---|
| HCl | 99.98 |
| Water | 0.01 |
| Benzene+paraffin heavies | 0.01 |

By carrying out the separation and purification process as described above, it is readily observed that a vaporous HCl stream being 99.98 percent pure is obtained. Furthermore, by operating in accordance with the method of this invention it is possible to eliminate the bulky scraped-surface chiller which is commonly used in the practice of fractional crystallization processes.

As will be evident to those skilled in the art, various modifications of this invention can be made or followed in the light of the foregoing disclosure and discussion without from the spirit or scope of the invention.

What is claimed is:

1. A method for removing at least one component from a multi-component vaporous mixture consisting essentially of HCl, water, benzene, and paraffins, said method comprising the steps of passing said mixture into a cooling zone; contacting the vaporous mixture in countercurrent flow with a circulating liquid consisting essentially of a calcium or sodium chloride brine solution, precooled to a temperature below the freezing point of at least one component of said vaporous mixture so that said component freezes, wherein said liquid is maintained at a level to position the vapor-liquid interface adjacent the introduction point of said precooled liquid to said zone, and said multi-component vaporous mixture is introduced below said interface; withdrawing said frozen component from a first section of said zone and recovering a purified vaporous stream from a second section of said zone.

2. A method according to claim 1 comprising in addition to the steps of removing said liquid from the bottom of said cooling zone, cooling it to below said freezing point, and recirculating said thus cooled liquid to an upper section of said zone.

3. The method of claim 2 comprising in addition the steps of passing a portion of the removed liquid to a purification zone, purifying the same, and returning said thus purified liquid to the cooling step for recirculation to said zone.

References Cited
UNITED STATES PATENTS

| | | | |
|---|---|---|---|
| 2,271,866 | 2/1942 | Liston | 55—71 |
| 2,765,049 | 10/1956 | Nafziger | 55—29 |
| 2,894,372 | 7/1959 | Newsome | 62—28 |
| 2,984,988 | 5/1961 | Berger et al. | 62—24 |
| 3,254,474 | 6/1966 | Van dijk | 55—61 |
| 3,260,059 | 7/1966 | Rosenberg et al. | 62—28 |
| 2,555,287 | 5/1951 | Hadden | 55—82 |
| 2,849,083 | 8/1958 | Nelson et al. | 55—71 |

REUBEN FRIEDMAN, *Primary Examiner.*

C. N. HART, *Assistant Examiner.*